United States Patent
Moon

[11] Patent Number: 5,960,543
[45] Date of Patent: Oct. 5, 1999

[54] METHOD FOR MANUFACTURING AN IMPELLER OF A PUMP

[75] Inventor: Seong-Dae Moon, Kyeongbook, Rep. of Korea

[73] Assignee: Daewoo Electronics Co., Ltd., Seoul, Rep. of Korea

[21] Appl. No.: 08/970,352

[22] Filed: Nov. 14, 1997

[30] Foreign Application Priority Data

Nov. 21, 1996 [KR] Rep. of Korea ............. 96-56032

[51] Int. Cl.[6] .................................................. B23P 15/00
[52] U.S. Cl. ................................. 29/889.2; 29/23.51
[58] Field of Search .......................... 29/23.51, 889.2, 29/889

[56] References Cited

U.S. PATENT DOCUMENTS

| | | | |
|---|---|---|---|
| 3,060,334 | 10/1962 | Favre | 310/38 |
| 3,732,613 | 5/1973 | Steigerwald | 156/73 |
| 3,920,504 | 11/1975 | Shoh et al. | 156/580 |
| 4,247,346 | 1/1981 | Maehara et al. | 156/73.5 |
| 5,257,442 | 11/1993 | Tanaka et al. | 29/23.51 |
| 5,277,744 | 1/1994 | Snyder . | |
| 5,538,395 | 7/1996 | Hager . | |

*Primary Examiner*—Irene Cuda
*Attorney, Agent, or Firm*—Jacobson, Price, Holman & Stern, PLLC

[57] ABSTRACT

Apparatus and method for manufacturing an impeller consisting of a body with many vanes and a shroud joined with the body. The apparatus comprises a die for chucking the body, a horn for supporting the shroud to be in contact with the vanes while the body is chucked by the die, a torque motor for applying vibration to the horn, and a pneumatic cylinder for giving pressure to the torque motor so that the shroud and the body are pushed in a contacting direction with each other. The torque motor is driven by half-wave rectified alternating current, and generates twisting vibration of the frequency between 10 Hz and 1 kHz. The shroud and the body are firmly joined by the twisting vibration. Thus little burr is generated. Further, the present invention can be adopted for manufacturing the impeller elements of diverse materials.

1 Claim, 6 Drawing Sheets

METHOD FOR MANUFACTURING AN IMPELLER OF A PUMP

BACKGROUND OF THE INVENTION

1. Field of the Invention

The present invention relates to an apparatus and a method for manufacturing an impeller of a pump, and more particularly to an apparatus and a method for manufacturing an impeller in which a body of the impeller and a shroud are joined together by a twisting vibration.

2. Prior Art

A pump 1 used in a system for discharging or circulating fluid has, as shown in FIG. 1, a motor housing 3 for accommodating a motor assembly and a pump housing 2 for accommodating water. The motor assembly installed in the motor housing 3 comprises a stator 8, a rotor 7, and a rotational shaft 9 inserted to the rotor 7 by force. The rotational shaft 9 is supported by a first bearing 5 and a second bearing 6. At the end part of the rotational shaft 9, an impeller 10 is assembled. The impeller 10 is disposed in the pump housing 2.

When the motor assembly is supplied with electric power, the rotor 7 is rotated by the magnetic force generated between the rotor 7 and the stator 8, and then the rotational shaft 9 and the impeller 10 assembled with the rotational shaft 9 are rotated by the rotor 7. When the impeller 10 is rotated, the water accommodated in the pump housing 2 is pumped out. Part of the water flows into the motor assembly through the first bearing 5, and then the rotor 7 and the stator 8 are cooled thereby.

FIG. 2 is an enlarged exploded side sectional view of an impeller installed into the pump in FIG. 1. The impeller 10 is rotated by the motor assembly to discharge the water flowed in the housing. The impeller 10 comprises a body 11 and a shroud 13. The body is formed with a plurality of vanes 12 (or wings) and a boss 11a. The shroud 13 is joined with the vanes 12 of the body 11. When the impeller 10 rotates, the water in the pump housing 2 flows, as designated by the direction of the arrows, in through the opening of the shroud 13, and then it is discharged through the side part of the vanes 12.

Such an impeller is manufactured with engineering plastic or noryl, and the shroud 13 and the body 11 are joined by ultrasonic welding or abrasive fusing by rotation.

However, although the ultrasonic welding is an appropriate method for joining the circular elements like the impeller 10, the material which can be joined by the ultrasonic welding is confined to a few materials, so there is a shortcoming that the choice of material to improve the performance of the impeller 10 is restricted.

Furthermore, according to the abrasive fusing by rotation, since the edge of the vane 12 is narrow, there is a problem that a lot of burr is generated at the joining part thereof. That is because the rotational abrasive fusing is a proper method for the elements in which the surfaces to be joined are plane, and is not a proper method for the impeller 10 which should be manufactured by joining the plane surface of the shroud 13 with the edge part of the vane 12. If the burr is generated, the additional process for eliminating the burr is required, so the manufacturing process of the impeller 10 becomes complex. Further, if the burr is not eliminated sufficiently, it hinders the flow of water circulated via the motor assembly, whereby the cooling efficiency of the motor assembly is lowered and the overheating of the motor assembly occurs.

SUMMARY OF THE INVENTION

The present invention has been proposed to overcome the above described problems in the prior art, and accordingly it is an object of the present invention to provide an apparatus for manufacturing the impeller, in which little burr is generated during the joining of the body with the shroud, and which can be adopted to the impeller elements of diverse materials.

To achieve the above object, the present invention provides an apparatus for manufacturing an impeller consisting of a body having a plurality of vanes and a shroud being joined with said body, said impeller for discharging water flowed into a housing of a pump, said apparatus comprising: a die for chucking said body; a horn for supporting said shroud to be in contact with said vanes while said body is chucked by said die, said horn for amplifying a vibration transmitted thereto; a torque motor for applying vibration of a predetermined frequency to said horn; and a pneumatic cylinder for giving pressure to said torque motor so that said shroud and said body are pushed in a contacting direction with each other.

Here, said torque motor comprises a rotational shaft, and a torsion bar in which one end thereof is connected with said rotational shaft and the other end thereof is fixed at a predetermined position. Said torque motor is driven by a half-wave rectified alternating current, and the frequency of the alternating current is between 10 Hz and 1 kHz. The torque motor generates a twisting vibration by rotation of said rotational shaft due to an application of current from the outside and return of said rotational shaft due to a torsion of said torsion bar.

Further, it is preferable to further comprise a means for controlling a torsion constant of said torsion bar by controlling a length of said torsion bar. Here, said controlling means comprises: a fixing plate assembled with said torsion bar to be movable relatively to said torsion bar along a longitudinal direction of said torsion bar and to be fixed with said torsion bar along a twisting direction of said torsion bar; and a means for moving said fixing plate along the longitudinal direction of said torsion bar. The torsion of said torsion bar is controlled by controlling the torsion constant. Therefore, the most proper torsion of the torsion bar according to a natural frequency of the impeller to be manufactured can be selected.

Also, according to the present invention, a method for manufacturing the impeller performed by such an impeller manufacturing apparatus is provided.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENT

Figure 1:
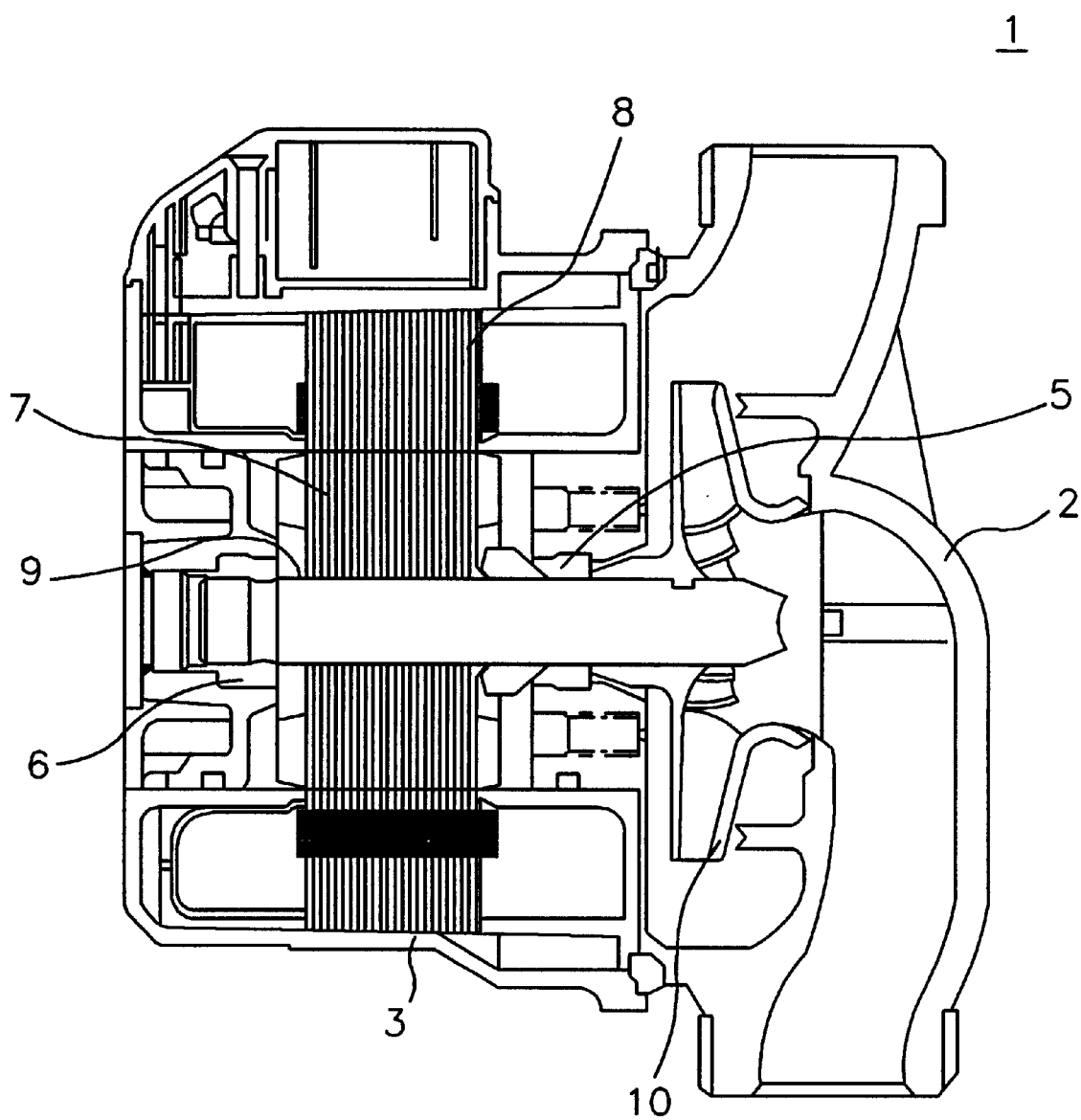
FIG. 1 is a side sectional view of a conventional pump.
Figure 2:
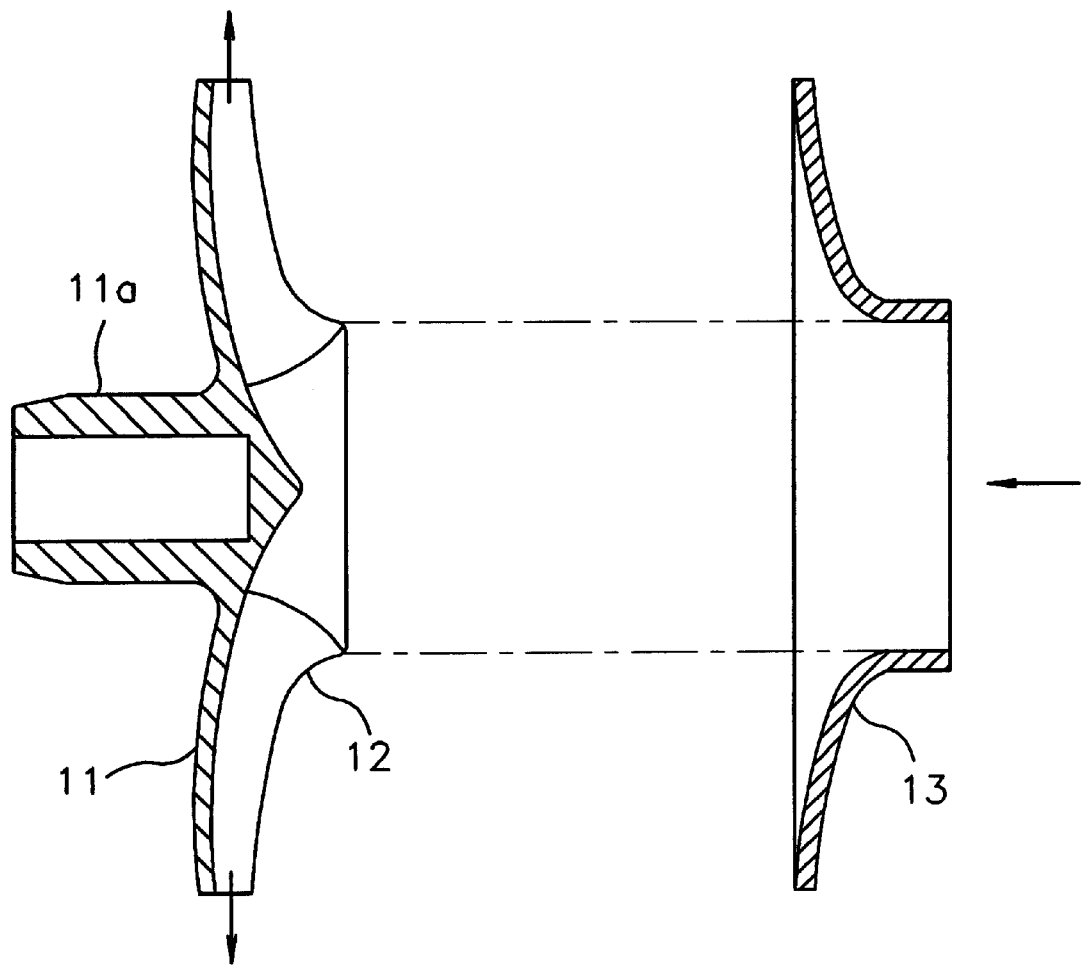
FIG. 2 is an enlarged exploded side sectional view of an impeller installed in the pump in FIG. 1.

Hereinafter, the present invention will be described in detail with reference to the drawings. The same parts with the parts explained in the prior art are designated with the same reference numerals with the numerals in FIGS. 1 and 2.

Figure 3:
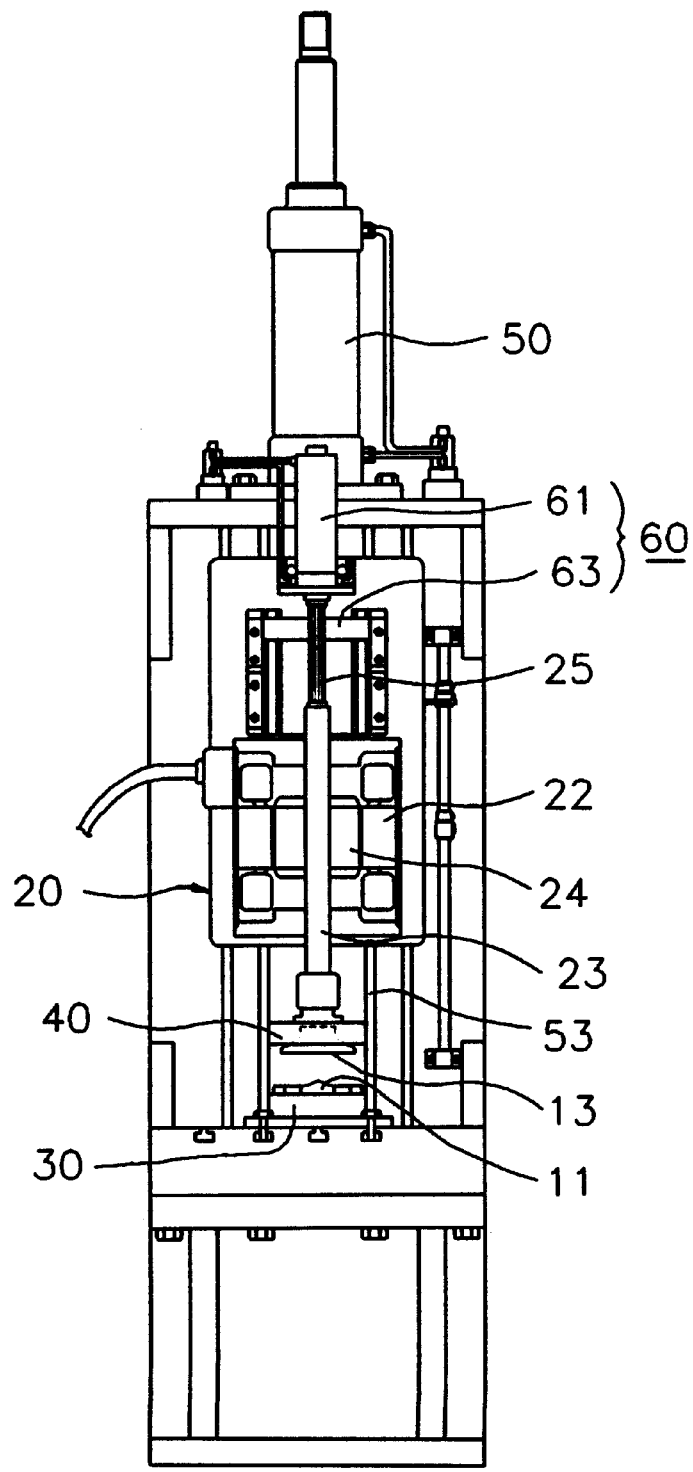
FIG. 3 is a front view of an apparatus for manufacturing the impeller according to the present invention.
Figure 4:
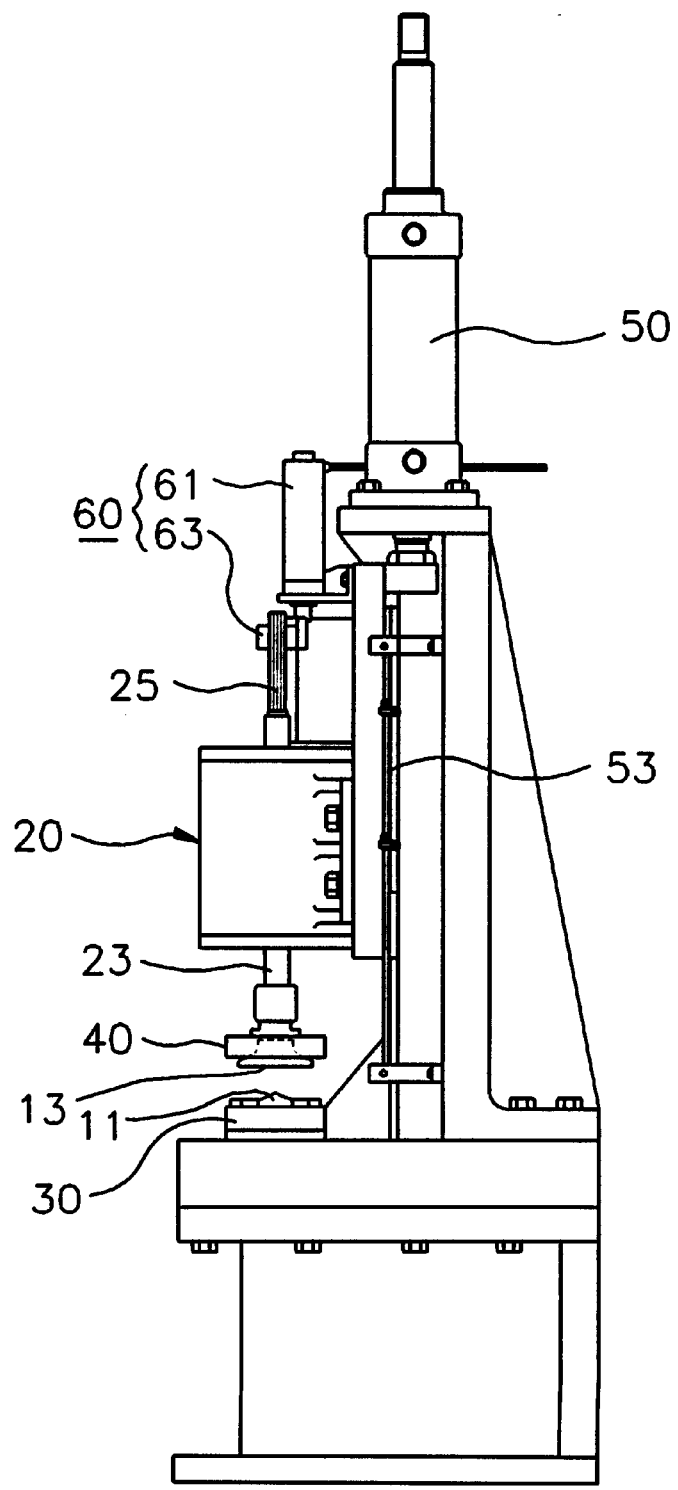
FIG. 4 is a side view of FIG. 3.

FIG. 3 is a front view of an apparatus for manufacturing the impeller according to the present invention, and FIG. 4 is a side view of FIG. 3. The apparatus for manufacturing the impeller comprises a die 30, a horn 40, a torque motor 20, and a pneumatic cylinder 50.

The die 30 chucks the boss 11a of the impeller 10 to fix the body 11 of the impeller 10, and the horn 40 supports the shroud 13 at the upper side of the body 11. The horn 40 amplifies the vibration transmitted from the torque motor 20.

The torque motor 20 applies the vibration to the horn 40 at a predetermined frequency. The torque motor 20 is used as a substitute for a high frequency oscillator which is used as a vibration generating means in the ultrasonic welding method, and it generates vibration with a strong rotational torque. The torque motor 20 comprises stator 22 and an armature 24 which generate the rotational torque by the magnetic force between them, a rotational shaft 23 which is rotated by the armature 24, a torsion bar 25 in which one end thereof is connected with the rotational shaft 23 and the other end thereof is fixed at a predetermined position. The horn 40 is fixed at the rotational shaft 23.

Figure 6:
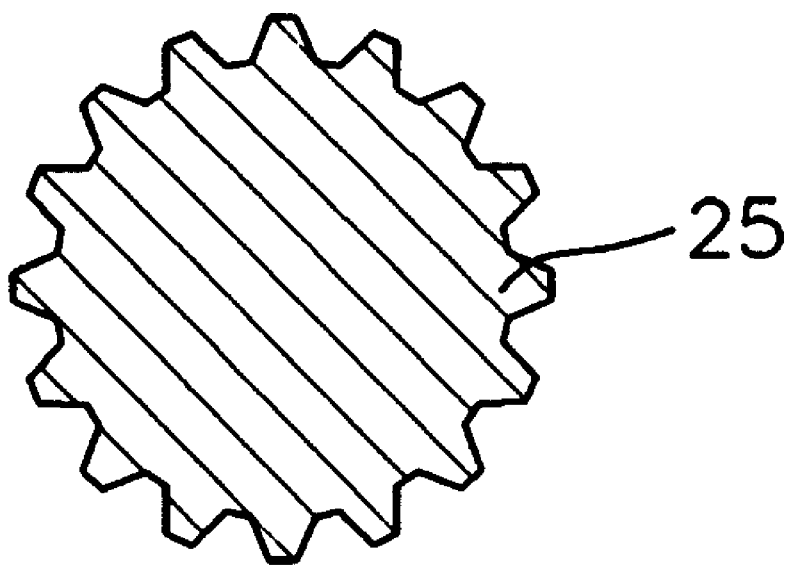
FIG. 6 is an enlarged sectional view of a torsion bar.

At the upper side of the torsion bar 25, a device 60 for controlling a length of the torsion bar 25 is installed. The controlling device 60 comprises a plate 63 for fixing aforementioned the other end of the torsion bar 25, and a control cylinder 61 for moving the fixing plate 63 along the longitudinal direction of the torsion bar 25. The torsion bar 25 is formed with a spline at the outer periphery thereof as shown in FIG. 6, and the fixing plate 63 is formed with a through-going hole which is form-fitted with the spline. Therefore, the torsion bar 25 is fixed with the fixing plate 63 at the rotational direction of the torsion bar 25, and is movable relatively to the fixing plate 63 along the longitudinal direction thereof. The length of the torsion bar 25 is varied by the vertical movement of the fixing plate 63. When the length of the torsion bar is varied, the torsion constant which determines the torsion of the torsion bar 25 is varied, and then the torsion of the torsion bar 25 is varied. Therefore, the proper torsion according to the natural frequency of the impeller 11 can be selected, so the manufacturing efficiency of the impeller 10 can be improved.

Figure 5:
FIG. 5 is an exemplary view of a half-wave rectified alternating current for driving the torque motor in FIG. 4.

If alternating current is applied to the armature 24, the direction of the magnetic force between the armature 24 and the stator 22 alternates according to the frequency of the alternating current, so the rotating direction of the armature 24 alternates. However, in the present invention, a half-wave rectified current as shown in FIG. 5. is applied. By the half-wave rectified current, the rotational shaft 23 is rotated at a fine angle when the half-wave rectified current is ON, and the torsion bar 25 is twisted as much as the rotated angle of the rotational shaft 23. While the applied half-wave rectified current is OFF, since the magnetic force between the stator 22 and the armature 24 is not generated, the torsion bar 25 which has been twisted is returned to its original state. Accordingly the rotational shaft 23 which has been rotated at a fine angle is returned to the original position. Therefore, as the current is repeatedly turned ON/OFF, the rotational shaft 23 vibrates along the rotational direction at the same frequency with the frequency of the applied alternating current.

The half-wave rectified current applied to the armature 24 can be easily obtained by a rectifying circuit with a diode, etc., or a switching circuit with a solid state relay. The frequency of the alternating current is determined in consideration of the characteristic of the material of the impeller 10, and preferably it is determined in the frequency range between 10 Hz and 1 kHz.

The pneumatic cylinder 50 moves the torque motor 20 along the vertical direction. When the torque motor 20 is moved by the pneumatic cylinder 50, the vertical movement of the torque motor 20 is guided by a plurality of guide rail 53.

Hereinbelow, the method for manufacturing the impeller 10 by the apparatus for manufacturing the impeller 10 according to the present invention will be described.

At first, the body 11 which is formed with the vanes 12 and the boss 11a, and the shroud 13 are molded respectively. Next, the body 11 is chucked by the die 30, and the shroud 13 is supported by the horn 40. The pneumatic cylinder 50 moves the torque motor 20 down so that the shroud 13 and the body 11 is pushed to be contacted with each other. The pushing force is determined in consideration of the vibration frequency and characteristic of the material of the impeller, etc. The torsion of the torsion bar 25 is controlled by the controlling device 60 to be most proper according to the natural frequency of the impeller 11. When the half-wave rectified alternating current is applied to the torque motor 20, the twisting vibration which vibrates along the rotational direction of the rotational shaft 23 is generated. The vanes 12 and the shroud 13 are joined with each other by the abrasive fusing due to the twisting vibration.

In the ultrasonic welding, the ultrasonic vibration of the frequency between 15 kHz and 35 kHz is used, and in the rotational abrasive fusing, the rotational velocity between 1700 rpm and 12000 rpm is used, but in the present invention, the twisting vibration of the frequency between 10 Hz and 1 kHz is used. The impeller 10 is manufactured generally with a crystalline resin having superior heat-resistance and stiffness. However, the crystalline resin cannot maintain a strong adhesive state by the ultrasonic welding, but can be firmly joined by the abrasive fusing by twisting vibration in the present invention. Furthermore, the burr is generated less than in the rotational abrasive fusing, so the additional process for eliminating the burr is not needed.

As described above according to the present invention, the apparatus and method for manufacturing the impeller are provided, in which the body and the shroud are joined firmly irrespective of the material, and little burr is generated.

Although the present invention has been described and illustrated in detail, it is clearly understood that the same is by way of illustration and example only and is not to be taken by way of limitation, wherein the spirit and scope of the present invention is limited only by the terms of the appended claims.

What is claimed is:

1. An apparatus for manufacturing an impeller consisting of a body having a plurality of vanes and a shroud being joined with said body, said impeller for discharging water flowed into a housing of a pump, said apparatus comprising:

a die for chucking said body;

a horn for supporting said shroud to be in contact with said vanes of said body, said horn amplifying a vibration transmitted thereto;

a torque motor for generating and applying a twisting vibration to said horn, wherein said torque motor has a stator and an armature for generating a rotational torque through magnetic force resulting from an input half-wave rectified alternating current, a rotational shaft rotating through the rotational torque generated by the stator and the armature, and a torsion bar in which one end thereof is connected with said rotational shaft and the other end thereof is fixed at a predetermined position, whereby the twisting vibration is generated by rotation and return of said rotational shaft according to the input half-wave rectified alternating current;

a controlling means having a fixing plate assembled with said torsion bar to be movable relative to said torsion bar along a longitudinal direction of said torsion bar, and a control cylinder for moving said fixing plate along the longitudinal direction of said torsion bar and controlling a torsion constant of said torsion bar by varying a length between the fixing plate and the rotational shaft through the vertical movement of the fixing plate; and a pneumatic cylinder for forcing the torque motor toward the die so that said shroud is in contact with said body.

* * * * *